United States Patent [19]

Rieder et al.

[11] Patent Number: 4,631,403
[45] Date of Patent: Dec. 23, 1986

[54] LENGTH MEASURING INSTRUMENT COMPRISING A SCALE MEMBER AND A SIGNAL-GENERATING SCANNING UNIT WHICH IS MOVABLE ALONG THE SCALE MEMBER

[75] Inventors: Heinz Rieder, St. Pantaleon; Max Schwaiger, Ostermiething, both of Austria

[73] Assignee: RSF Elektronik Gesellschaft m.b.H., Tarsdorf, Austria

[21] Appl. No.: 815,991

[22] Filed: Jan. 2, 1986

[30] Foreign Application Priority Data

Jan. 11, 1985 [AT] Austria ............................. 56/85

[51] Int. Cl.$^4$ ............................. H01J 3/14; H01J 5/16
[52] U.S. Cl. ............................. 250/237 G; 33/125 C
[58] Field of Search ............. 250/237 G, 231 SE; 356/395; 340/347 P; 277/DIG. 7; 33/125 C

[56] References Cited

U.S. PATENT DOCUMENTS

| | | | |
|---|---|---|---|
| 3,816,003 | 6/1974 | Litke | 356/169 |
| 4,031,595 | 6/1977 | Welker | 250/237 G |
| 4,376,543 | 3/1983 | Sakagami | 277/DIG. 7 |
| 4,400,890 | 8/1983 | Ohkubo et al. | 33/125 C |
| 4,564,294 | 1/1986 | Ernst | 250/237 G |

Primary Examiner—David C. Nelms
Assistant Examiner—William L. Oen
Attorney, Agent, or Firm—Kurt Kelman

[57] ABSTRACT

The scanning unit which is movable along the scale member comprises signal-generating means, which are accommodated in one or more covering hoods. Each covering hood has an annular boundary surface facing the scale member and is provided at said boundary surface with an annular seal which consists of elastomeric material and is in sealing contact with the scale member under initial compressive stress throughout the peripheral extent of the boundary surface. The covering hood and the scale member thus define between them a measuring chamber in which the atmospheric conditions are favorable for an accurate measurement. As the scanning unit is moved along the scale member, the measuring chamber will always be disposed at a portion of the scale member in which the surface of the scale member has just been cleaned by the sliding contact between the annular seal and the scale member.

10 Claims, 3 Drawing Figures 4,631,403

LENGTH MEASURING INSTRUMENT COMPRISING A SCALE MEMBER AND A SIGNAL-GENERATING SCANNING UNIT WHICH IS MOVABLE ALONG THE SCALE MEMBER

BACKGROUND OF THE INVENTION

1. Field of the Invention

This invention relates to a length measuring instrument comprising a scale member, which is provided with a scale, and a scanning unit, which is movable along the scale and provided with signal-generating means, which are accommodated in at least one covering hood, which is open toward the scale member and together with the scale member defines at least one measuring chamber and is provided with elastomeric scraping means in contact with the scale member.

More particularly, the invention relates to incremental length measuring instruments for an optoelectronic, capacitive, inductive or magnetic scanning of a suitably designed scale member.

2. Description of the Prior Art

Length measuring instruments of the present kind are mounted, e.g., on machine tools and may be used for a normal measurement of lengths or may be included in control systems for machine tools or industrial robots.

A length measuring instrument of the kind described first hereinbefore has been disclosed in U.S. Pat. No. 4,400,890 and comprises a scale member consisting of permanent magnets having a length of at least 2 mm each. Two spaced apart detecting heads are provided and generate signals in response to the movement of the scanning unit or detecting head body along the scale. The scale member is mounted on the bed of a machine tool and has an exposed top surface. The covering hood or case has the same width as the scale member and bears on the scale member with scrapers, which are attached to the ends of the hood and extend transversely to the scale. The scrapers serve to remove coarse impurities, particularly particles of low-reluctance material, from the scale member.

This known measuring instrument can be used only for coarse measurements and does not permit a measurement with high accuracy.

For more accurate measurements, incremental scales having much smaller increments are arranged to cooperate with suitable scanning units. Such length measuring instruments for an optoelectronic scanning have been disclosed in U.S. Pat. No. 3,816,003 and European Pat. No. 2,0120 205. They comprise a scale having small increments and are provided with electronic circuitry including bridge or potentiometer circuits or interpolating computers for effecting an electronic subdivision of the scale increments by a processing of the phase-displaced signals generated in response to the scanning of the scale. The higher the resolution provided by the length measuring instrument, the more susceptible will the instrument be to errors due to a contamination of the scale, a condensation of droplets on the scale and a similar contamination on the scanning unit. For this reason such length measuring instruments usually comprise a tubular housing, in which the scale member, consisting in most cases of glass, and the scanning unit are encapsulated, and the scanning unit is connected to a sword, which extends between pairs of sealing lips through a slot formed in the housing and can be operated to move the scanning unit along the scale. If the scale is to be optically scanned, this can be effected with light transmitted through the scale member from light sources disposed on one side of the scale member and moved along the scale by the scanning unit, which comprises light receivers disposed on the other side of the scale member. Alternatively, scanning can be effected with reflected light if the light sources and receivers are disposed on the same side of the scale member, which may be provided with a reflecting coating on the opposite side.

In order to reduce the risk of contamination or a condensation of moisture, U.S. Pat. No. 3,816,003 to provide in the slot of the housing two pairs of sealing lips, which pairs are arranged one over the other and cooperate with the sword. But in that known arrangement the gaps formed between said sealing lips by the sword have vertically aligned end portions so that moisture and dust can enter the interior of the housing.

European Pat. No. 2,0120, 205 discloses for a scanning with transmitted light an instrument in which the light sources and the light receivers are encapsulated in separate chambers and discloses for a scanning with reflected light an instrument in which the light sources and the light receivers are accommodated in a common chamber, which is defined by a window of transparent material, which comprises a reticle for scanning the scale and is moved along the scale member in close proximity thereto. In either case, the guiding means are disposed in separate parts of the encapsulating housing. The gap between the window or the scanning reticle and the scale member should be so small that any droplets condensed on the scale member will be transformed into a liquid film between the window and the scale member. Although that arrangement is highly expensive, it does not reliably prevent a contamination of the scale member and an occurrence of measurement errors resulting from condensed droplets.

SUMMARY OF THE INVENTION

It is an object of the invention to provide a length measuring instrument which is of the kind described first hereinbefore and comprises simple means for preventing a contamination of the scale member and an occurrence of measurement errors which are due to droplets or moisture.

That object is accomplished in accordance with the invention in that the scraping means provided on the covering hood constitute an annular seal, which is made of elastomeric material and in sealing contact with the scale member to seal the measuring chamber from the outside throughout the peripheral extent of the annular surface with which the hood faces the scale member.

The annular seal is slidable on the scale member and seals, the measuring chamber from the outside. As the scanning unit is moved along the scale, the latter can be scanned only in a region which has just been cleaned by the annular seal. Because the measuring chamber is small in volume, it will not contain more than a negligibly small amount of moisture even if the instrument is used in a humid environment. When moisture has condensed on the scale member, those parts of the scanning unit which are contained in the measuring chamber will face the scale member in a portion thereof which has just been cleaned by the annular seal. For this reason there will be no condensed moisture in the region in which the scale is being scanned. In instruments for an optoelectronic scanning with reflected light, the light receivers and any scanning reticles will be heated by the light sources. Whereas the light-emitting diodes used as light sources will effect only a slight temperature rise, the resulting temperature in the measuring chamber will be sufficient to prevent a condensation of moisture on the measuring elements or the areas being scanned.

In a preferred embodiment, the covering hood has two end portions which taper in width along the scale and the annular seal comprises at said end portions similarly shaped end portions in sealing contact with the scale member. In such an arrangement any dust and moisture on the scale in front of the scanning unit will be scraped aside by the leading end portion of the annular seal and the sliding movement of the covering hood in contact with the scale member will not give rise to vibration.

The invention is applicable to an optoelectronic length measuring instrument for scanning with transmitted light, comprising a scanning unit, which includes a reticle plate and light receivers on one side of the scale member and light sources disposed on the other side of the scale member. In such an instrument the scanning unit comprises two covering hoods, which are disposed on opposite sides of and are open toward the scale member and together with the scale member define two measuring chambers, one of which contains the reticle plate and the light receivers and the other of which contains the light sources, and each of said covering hoods has an annular boundary surface facing said scale member and is provided at said boundary surface with an annular seal, which is in sealing contact with said scale member throughout the peripheral extent of said boundary surface.

In a preferred embodiment in which the scale and the scanning unit are encapsulated in a tube which is formed with a slot that is lined by sealing lips and the scanning unit is connected to a sword extending out of said tube between said sealing lips, a contamination or condensation of moisture will be more reliably prevented if the sword comprises two sections, which are spaced apart in the longitudinal direction of the scale and offset from each other transversely to said longitudinal directions and each of said sections extends between a separate pair of sealing lips. Because the sections of the sword are longitudinally spaced apart, each of said sections will be in register with two sealing lip portions which are in contact with each other and belong to the sealing lips cooperating with the other section of the sword. As a result, any dirt and moisture which has penetrated between the outer sealing lips will be substantially kept back in the space disposed between the pairs of sealing lips. That space might be connected to a source of compressed air or inert gas and may be pressurized or may be preheated by heated inert gas blown through that space.

DETAILED DESCRIPTION OF THE PREFERRED EMBODIMENT

Figure 1:
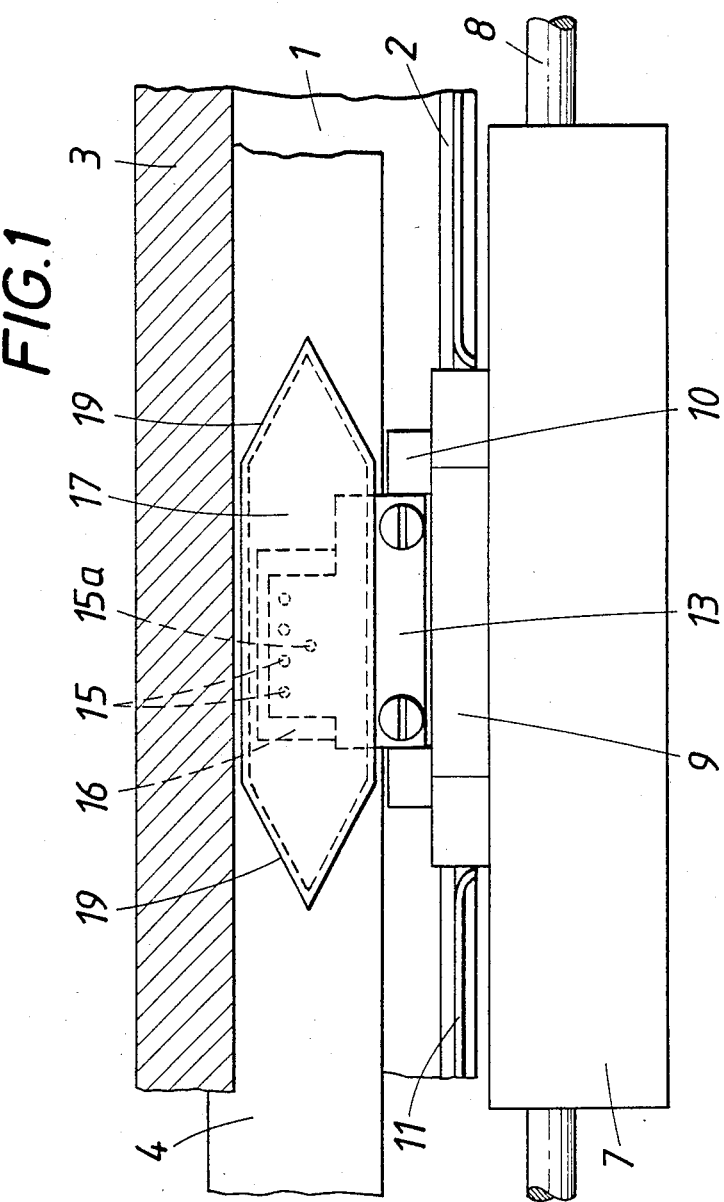
FIG. 1 is a diagrammatic longitudinal sectional view showing a length measuring instrument in accordance with the invention comprising a slotted encapsulating tube and showing one covering hood of the instrument.

Further details and advantages of the invention are apparent from the following detailed description of illustrative embodiments of the invention with reference to the drawing.

Figure 2:
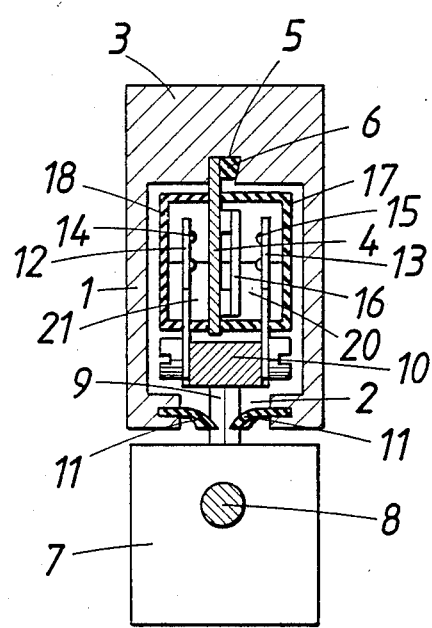
FIG. 2 is a transverse sectional view showing the instrument of FIG. 1.

In the embodiment shown in FIGS. 1 and 2, the length measuring instrument comprises a tubular housing 1, which in most cases consists of an extruded tube, which is rectangular in cross-section and formed in its bottom wall with a slot 2. The tube 1 has a top wall 3 which is much thicker than the other walls of the tube so that the latter has an adequate stiffness. The rectangular tube 1 contains in its interval cavity a scale member 4 of glass, one side edge of which is inserted in a groove 5 formed in the inside surface of the top wall 3 and is clamped in position in said groove by an elastomeric strip 6 also inserted in said groove. A major portion of the scale member protrudes into the cavity of the tube 1 and is provided with an incremental scale consisting of a bar pattern and may be provided on a track which is parallel to the scale with sets of bars for defining reference marks.

A feeler is provided, which is associated with the object to be measured and carries a coupling member 7, which is movable along a screw 8 of a machine tool and may be coupled to a toolholder. The feeler carries also a sword 9, which extends through the slot 2 into the cavity of the tube 1, and a scanning carriage 10, which is a part of a scanning unit that is accommodated in the cavity of the tube. The sword 9 extends in the slot 2 between two sealing lips 11, which line opposite sides of the slot 2.

The scanning carriage 10 carries printed circuit boards 12, 13, which are disposed on opposite sides of the scale member 4. The printed circuit board 12 carries light emitting diodes 14. The printed circuit 13 carries light receivers 15 consisting of phototransistors or photodiodes, and an additional phototransistor 15a for scanning the reference marks.

On that side of the scale member 4 which is provided with the scale, a reticle plate 16 is provided, which is movable along the scale in unison or substantially in unison with the scanning carriage 10. The reticle plate 16 is provided with sliders in sliding contact with the scale member 4. The reticle plate carries reticles, which register with respective light-emitting diodes 14 and respective phototransistors 15, 15a and serve to scan the scale and the reference mark track.

For the sake of simplicity, the mounting for the reticle plate 16 has not been shown. In one embodiment the reticle plate is rigidly connected to the scanning carriage 10. In another embodiment that reticle plate 16 guided on the scale member is actuated by separate drive means, which are controlled by correcting means. Said correcting means may comprise a correcting cam track provided in the cavity of the tube 1 and a feeler and slightly advancing or retracting the scanning plate in dependence on the configuration of the correcting cam track. The correcting means and the means for adjusting the scanning plate may be disposed in part outside the subsequently described covering hoods and may be connected to the scanning plate by means which extend through lead-throughs provided in such hoods.

Two covering hoods 17, 18 made of elastomeric material are disposed in the tube 1 on opposite sides of the scale member 4 and are open toward the scale member.

Each of said hoods has an annular boundary surface, which faces the scale member 4 and which is constituted by an annular seal, which is in sealing contact with the scale member 4 under initial compressive stress. Each covering hood extending along the scale has mutually opposite end portions 19, which taper in width along the scale. The annular seal has corresponding end portions, which are in sealing contact with the scale member under initial compressive stress. The printed circuit boards 12 and 13 extend through slots of the respective hoods in sealing contact therewith and extend into the associated measuring chamber 20 or 21, which is defined by the hood 17 or 18 and the scale member 4. The scanning carriage 9 may be provided with holders, which mount the covering hoods 17, 18 and ensure that the annular seals at the boundary surfaces of the covering hoods 17, 18 will contact the scale member 4 under initial compressive stress.

Figure 3:
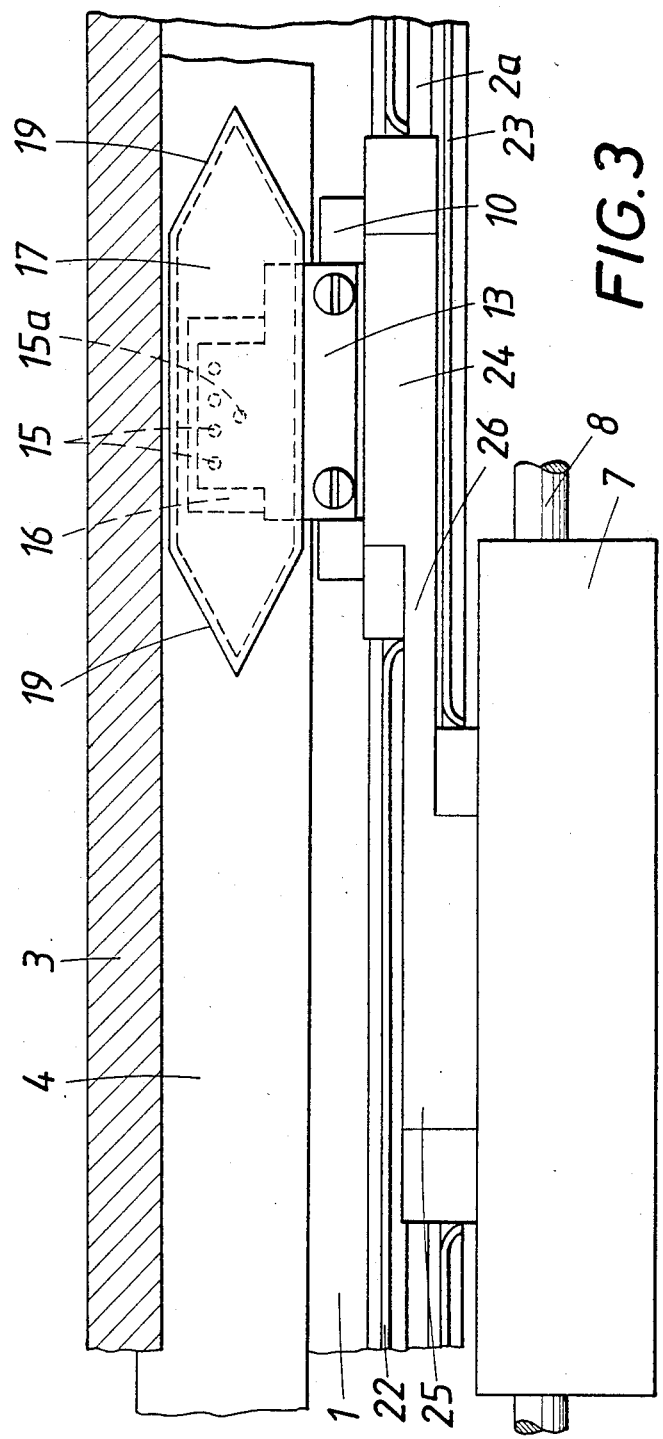
FIG. 3 is a view that is similar to FIG. 1 and shows a different embodiment.

The embodiment shown in FIG. 3 is substantially similar to the embodiment shown in FIGS. 1 and 2 with the exception of the elements which define or are contained in the slot 2a formed in the tube 1. Like parts are designated with the same reference characters. In the embodiment shown in FIG. 3 the bottom wall of the rectangular-section tube 1 is thicker than the side walls of the tube. That bottom wall is formed with the slot 2a, which accommodates outer and inner pairs of sealing lips 22 and 23. Said pairs are spaced apart transversely to the longitudinal direction of the scale member 4. The inner pair of sealing lips 22 are disposed adjacent to the inner edge of the slot 2a. The outer pair of sealing lips 23 are disposed adjacent to the outer edge of the slot 2a. The sword comprises two sections 24, 25, which are spaced apart along the scale and offset transversely thereto and extend between and are in sealing contact with the pairs of sealing lips 22, 23, respectively. Between the sections 24, 25, the sword comprises a connecting section 26, which connects the sections 24, 25 and extends in the slot 2a in the space which is sealed on the inside and ouside by the sealing lips 22 and 23. That connecting section 26 is connected to the scanning unit and to the coupling member 7. Because the sections 24, 25 are spaced apart along the tube 1, their adjacent ends are longitudinally spaced apart. As the sword is moved along the slot 2a, the section 24 will be in register with mutually contacting portions of the outer sealing lips 23 and the section 25 will be in register with mutually contacting portions of the inner sealing lips 22. The space which is confined in the slot 2a by the sealing lips 22, 23 may communicate with the outside through ports, such as bores, provided in the bottom wall of the tube 1 at the ends or on the sides of the slot 2a so that compressed air or an inert gas can be conducted through said ports into and out of the space between the sealing lips 22, 23. Such air or inert gas can escape through any leak which may be formed between the outer sealing lips 23 or between said outer sealing lips 23 and the sword section 25 so that an ingress of ambient air and dust into the encapsulated interior of the tube 1 will be prevented.

Covering hoods such as 17 and sealing means lining a slot in an arrangement as shown in FIG. 3 may also be used to ensure the formation of an encapsulated measuring chamber at the scale adjacent to the scanning unit and to seal an encapsulated cavity in a carrier for the scale member in measuring instruments arranged for a capacitive, inductive or magnetic scanning.

We claim:

1. In a length measuring instrument comprising
    a scale carrier,
    an elongate scale member secured to said scale carrier and provided with a longitudinal scale, and
    a scanning unit, which is associated with and movable along said scale member and comprises signal-generating means for scanning said scale and covering hood means which are open toward said scale member and define with said scale member at least one measuring chamber, which contains said signal-generating means,
    said covering hood means having at the periphery of said at least one measuring chamber at least one annular boundary surface facing said scale member,
    said covering hood means being provided with elastomeric scraping means disposed at said boundary surface and in sealing sliding contact with said scale member,
    the improvement residing in that
    said elastomeric scraping means comprise at least one annular seal, which is in sealing sliding contact with said scale member under initial compressive stress throughout the peripheral extent of said boundary surface.

2. The improvement set forth in claim 1, wherein
    said covering hood means comprise on at least one side of said scale member a covering hood, which is formed with said boundary surface and extends along said scale member and has opposite end portions which taper in width in the longitudinal direction of said scale member, and
    said boundary surface and said annular seal extend also on said end portions.

3. The improvement set forth in claim 1 as applied to a length measuring instrument in which said signal-generating means comprise light source means for emitting light onto said scale and optoelectronic light receivers for receiving light which has been emitted by said light-emitting means onto said scale.

4. The improvement set forth in claim 1 as applied to a length measuring instrument in which said signal-generating means are disposed on opposite sides of said scale member, said scanning unit comprises first and second covering hoods, which are disposed on opposite sides of said scale member and open toward said scale member and define first and second measuring chambers with said scale member, said signal-generating means are disposed in part in said first measuring chamber and in part in said second measuring chamber, each of said covering hoods has at the periphery of the associated measuring chamber an annular boundary surface facing said scale member, and each of said covering hoods is provided with elastomeric scraping means disposed at said boundary surface and in sealing sliding contact with said scale member,
    wherein said elastic scraping means of each of said covering hoods comprises an annular seal, which is in sealing sliding contact with said scale member under initial compressive stress throughout the peripheral extent of said boundary surface.

5. The improvement set forth in claim 2, as applied to a length measuring instrument in which said scale member is transparent and said signal-generating means comprise light source means accommodated in said first measuring chamber and operable to emit light onto said scale member, and optoelectronic light receiver means accommodated in said second measuring chamber and arranged to receive light which has been emitted by said light source means onto and has been transmitted by said scale member.

6. The improvement set forth in claim 5 as applied to a length measuring instrument in which said scanning unit comprises a reticle plate, which is disposed in said second measuring chamber between said scale member and said light receiver means and comprises reticle means in the path of light from said scale member to said light receiver means.

7. The improvement set forth in claim 1 as applied to a length measuring instrument in which said scale carrier is tubular and defines an internal cavity and is formed with a longitudinal slot, which is lined on opposite sides with sealing lip means, said scale member extends in said cavity in the longitudinal direction of said slot and said scanning unit is disposed in said cavity, and a sword is connected to said scanning unit and extends through said slot in sealing contact with said sealing lip means.

8. The improvement set forth in claim 7 as applied to an instrument in which said sealing lip means comprise first and second pairs of sealing lips, which extend throughout the length of said scale and are spaced apart transversely to the longitudinal direction of said scale and define in said slot a sealed space which is sealed by said sealing lips, wherein
    said sword comprises two sections, which are spaced apart in said longitudinal direction of said scale and are offset from each other transversely to said longitudinal direction,
    said first section of said sword extends between the sealing lips of only said first pair in sealing contact therewith,
    said second section of said sword extends between the sealing lips of only said second pair in sealing contact therewith,
    said sword comprises an additional section which connects said first and second sections and extends in said sealed space.

9. In a length measuring instrument comprising
    a tubular scale carrier, which defines and is formed with a longitudinal slot, which is lined on opposite sides with sealing lip means, which comprise first and second pairs of sealing lips, which extend throughout the length of said scale and are spaced apart transversely to the longitudinal direction of said scale and define in said slot a sealed space which is sealed by said sealing lips,
    an elongate scale member, which extends in said cavity in the longitudinal direction of said slot and is secured to said scale carrier and provided with a longitudinal scale,
    a scanning unit, which is disposed in said cavity and movable along said scale member and comprises signal-generating means for scanning said scale and covering hood means which are open toward said scale member and define with said scale member at least one measuring chamber, which contains said signal-generating means, and
    a sword, which is connected to said scanning unit and extends through said slot in sealing contact with said sealing lip means,
    the improvement residing in that
    said sword comprises two sections, which are spaced part in said longitudinal direction of said scale and are offset from each other transversely to said longitudinal direction,
    said first section of said sword extends between the sealing lips of only said first pair in sealing contact therewith,
    said second section of said sword extends between the sealing lips of only said second pair in sealing contact therewith,
    said sword comprises an additional section which connects said first and second sections and extends in said sealed space.

10. The improvement set forth in claim 9, wherein said sword is connected to a feeler disposed outside said tubular carrier.

* * * * *